United States Patent [19]
Kinoshita et al.

[11] Patent Number: 5,789,833
[45] Date of Patent: Aug. 4, 1998

[54] TOTALLY-ENCLOSED TRACTION MOTOR FOR ELECTRIC RAILCAR

[75] Inventors: Tsutomu Kinoshita; Nobuyuki Yagi, both of Tokyo, Japan

[73] Assignee: Kabushiki Kaisha Toshiba, Kawasaki, Japan

[21] Appl. No.: 754,328

[22] Filed: Nov. 21, 1996

[30] Foreign Application Priority Data

Nov. 24, 1995 [JP] Japan ................... 7-305545

[51] Int. Cl.$^6$ .................. H02K 9/08; H02K 9/10; H02K 9/22
[52] U.S. Cl. .................. 310/64; 310/58; 310/59
[58] Field of Search .................. 310/58, 59, 64, 310/61, 54, 89

[56] References Cited

U.S. PATENT DOCUMENTS

| | | | |
|---|---|---|---|
| 518,291 | 4/1894 | Thomson | 310/54 |
| 2,321,126 | 6/1943 | Breuer | 310/59 |
| 2,787,720 | 4/1957 | Ethier et al. | 310/57 |
| 4,110,643 | 8/1978 | Muller | 310/54 |
| 4,311,932 | 1/1982 | Olson | 310/61 |
| 4,395,816 | 8/1983 | Pangburn | 310/61 |
| 4,742,257 | 5/1988 | Carpenter | 310/62 |
| 4,839,547 | 6/1989 | Lordo et al. | 310/64 |

*Primary Examiner*—Clayton E. LaBelle
*Attorney, Agent, or Firm*—Oblon, Spivak, McClelland, Maier & Neustadt, P.C.

[57] ABSTRACT

A totally-enclosed traction motor for electric railcar including, a frame structure of totally-enclosed cylindrical shape which is provided with a window, a rotor shaft rotatably supported to the frame structure coaxially with the frame structure, a rotor of cylindrical shape coaxially fixed to the rotor shaft which is rotated with the rotor shaft as one body, a stator of cylindrical shape fixed to an inner surface of the frame structure coaxially with the rotor shaft with keeping a gap between an inner surface of the stator and an outer surface of the rotor, and a cooling body mounted to the frame structure so as to cover the window and provided with a plurality of heat absorbing fins fixed to the cooling body from the inside and a plurality of radiation fins fixed to the cooling body from the outside.

10 Claims, 12 Drawing Sheets

RAILCAR MOVING DIRECTION 5,789,833

1

TOTALLY-ENCLOSED TRACTION MOTOR FOR ELECTRIC RAILCAR

BACKGROUND OF THE INVENTION

1. Field of the Invention

This invention relates to a traction motor for an electric railcar, and more particularly to a totally-enclosed traction motor for an electric railcar.

2. Description of the Related Art

Conventionally, a motor for driving an electric railcar of an electric train and so on, (hereinafter referred to as a traction motor) is used which is provided with a self-ventilation fan fixed to a rotor shaft of the traction motor. When it is operating, the outer air is introduced into the traction motor so as to cool the traction motor by circulating the introduced air inside the traction motor by the self-ventilation fan.

In this construction, it is necessary to decompose the traction motor and clean the inside thereof periodically, because the inside of the traction motor is contaminated by the introduced outer air. Furthermore the noise of the self-ventilation fan during the operation is large. Accordingly, a traction motor is expected with the construction which can solve such problems.

For solving such problems, it is considered to adopt a totally-enclosed self-cooled traction motor for an electric car. One example of such a totally-enclosed self-cooled traction motor for an electric railcar is explained with reference to the drawings. FIG. 18 is a half longitudinal sectional view showing one example of a conventional totally-enclosed self-cooled traction motor for an electric car. FIG. 19 is a side view of the conventional totally-enclosed self-cooled traction motor shown in FIG. 18 installed on an electric railcar. FIG. 20 is a top view of the traction motors shown in FIG. 18 mounted on a bogie, and FIG. 21 is a sectional view of the traction motor along a line A—A shown in FIG. 20.

In these drawings, a traction motor 50 is fixed and supported to a part of a bogie frame 13 by bolts via bogie mounting arms 2A, 2B provided on an outer surface of a cylindrical frame 1 of traction motor 50. At the outer circumference of frame 1, a plurality of cooling fins 3A, 3B and 3C are provided as one body. At the inner surface of frame 1, a cylindrical stator core 5 is mounted. Stator coils 4 are arranged along the circumference of stator core 5.

At one open end of frame 1, a bearing bracket 6 is mounted, and to the other end of frame 1 a bearing housing 8 is mounted. A rotor shaft 11 is rotatably supported by bearing bracket 6 and bearing housing 8 via bearings 9, 10 respectively mounted on them. At the outer surface of bearing bracket 6, a plurality of cooling fins 7 are provided as one body.

A cylindrical rotor core 12 is fixed to rotor shaft 11 at the central position, and rotor bars 12A are arranged at the outer circumference of rotor core 11. Here, rotor core 12 along with rotor bars 12A is coaxially fixed to rotor shaft 11 and can be rotated with rotor shaft 11 as one body. Stator core 5 is fixed to an inner surface of frame 1 coaxially with rotor shaft 11, and a gap is provided between an inner surface of stator core 5 and an outer surface of rotor core 12.

As shown in FIGS. 20 and 21, one end of rotor shaft 11 is coupled to a coupling 16 so as to transmit the rotation force of the rotor to an axle 14 of a wheel 15 via a gearing system, composed of a gear wheel 56, a pinion 57 and a gear case 55 for housing gear wheel 56 and pinion 57, for running

2 the electric railcar of an electric train and so on. Here, two pairs of bearing cases 14A for axles 14 are also shown.

When it is operating, currents flow through stator coils 4 and rotor bars 12A, and as a result heat is generated therefrom. Due to the generated heat, the temperature of traction motor 50 rises. But, the generated heat is radiated outside of traction motor 50 via cooling fins 3A, 3B and 3C provided at an outer circumference of frame 1 and cooling fin 7 provided on bearing bracket 6, thereby to suppress the rising of the temperature of traction motor 50. When an electric train is running, as the running air flows around traction motor 50, the cooling of traction motor 50 by cooling fins 3A, 3B, 3C and 7 is executed effectively.

In a conventional traction motor for an electric railcar which is provided with a self-ventilation fan, the outer air is introduced into the traction motor so as to cool the traction motor when the traction motor is operating. On the other hand, in totally-enclosed self-cooled traction motor 50 for an electric railcar shown in FIGS. 18–21, the cooling of traction motor 50 is only executed by fins 3A, 3B, 3C and 7 provided on the outer circumference of traction motor 50. Accordingly, the cooling efficiency of this traction motor 50 is lower than that of the traction motor with the self-ventilation fan, with the result that the temperature of this traction motor 50 becomes higher than that of the traction motor with the self-ventilation fan. It is therefore difficult for this traction motor 50 to suppress the temperature rise within the rating limit.

For this reason, if the outer configurations of these conventional two traction motors are determined to be the same, the current capacity of the totally-enclosed self-cooled traction motor is to be smaller than that of the traction motor with self-ventilation fan. And if it is desired to obtain the totally-enclosed self-cooled traction motor having the same current capacity as that of the traction motor with the self-ventilation fan, the outer configuration of the former traction motor must be larger than that of the latter traction motor. In this case, it is impossible to install the totally-enclosed self-cooled traction motor within the space as shown in FIGS. 19 and 20, that is determined by a length between bogie frame 13 and axle 14, a length determined by the electric railcar limit over the rail, a length determined by a necessary gap under the car body and a length in the longitudinal direction between wheel 15 and the driving system.

As described above, it is impossible to install the conventional totally-enclosed self-cooled traction motor on a bogie of an electric railcar with the same large current capacity as that of the conventional traction motor with self-ventilation fan.

SUMMARY OF THE INVENTION

Accordingly, one object of this invention is to provide a totally-enclosed traction motor for an electric railcar which can improve the cooling effect of the traction motor.

Another object of this invention is to provide a totally-enclosed traction motor for an electric railcar which is capable of achieving downsizing and light weight of the traction motor.

Still another object of this invention is to provide a totally-enclosed traction motor for an electric railcar which can increase current capacity and the ratings of the traction motor.

A further object of this invention is to provide a totally-enclosed traction motor for an electric railcar which can prevent the contamination in the traction motor by the introduced outer air and can eliminate the periodical maintenance of the traction motor.

Still another object of this invention is to provide a totally-enclosed traction motor for an electric railcar which can reduce the noise generated by the traction motor.

These and other objects of this invention can be achieved by providing a totally-enclosed traction motor for an electric railcar including, a frame structure of totally-enclosed cylindrical shape which is provided with a window, a rotor shaft rotatably supported to the frame structure coaxially with the frame structure, a rotor of cylindrical shape coaxially fixed to the rotor shaft which is rotated with the rotor shaft as one body, a stator of cylindrical shape fixed to an inner surface of the frame structure coaxially with the rotor shaft with keeping a gap between an inner surface of the stator and an outer surface of the rotor, and a cooling body mounted to the frame structure so as to cover the window and provided with a plurality of heat absorbing fins fixed to the cooling body from the inside and a plurality of radiation fins fixed to the cooling body from the outside.

According to one aspect of this invention, there is provided a totally-enclosed traction motor for electric railcar including, a frame structure of totally-enclosed cylindrical shape which is provided with a pair of air windows in an upper part of the frame structure, a rotor shaft rotatably supported to the frame structure coaxially with the frame structure, a rotor of cylindrical shape coaxially fixed to the rotor shaft which is rotated with the rotor shaft as one body, a stator of cylindrical shape fixed to an inner surface of the frame structure coaxially with the rotor shaft with keeping a gap between an inner surface of the stator and an outer surface of the rotor, a fan for air circulation fixed to the rotor shaft which is rotated with the rotor shaft as one body, and a cooling unit provided on an upper surface of the frame structure. The cooling unit is composed of a pair of connecting sections, a cooling pipe connected between the connecting sections and a plurality of cooling fins fixed to the cooling pipe. The connecting sections are fixed to the upper surface of the frame structure so as to cover respective one of the air windows, and the frame structure is further provided with a window. The totally-enclosed traction motor for electric railcar further includes a cooling body mounted to the frame structure so as to cover the window and provided with a plurality of heat absorbing fins fixed to the cooling body from the inside and a plurality of radiation fins fixed to the cooling body from the outside.

According to another aspect of this invention, there is provided a totally-enclosed traction motor for electric railcar including, a frame structure of totally-enclosed cylindrical shape, a rotor shaft rotatably supported to the frame structure coaxially with the frame structure, a rotor of cylindrical shape coaxially fixed to the rotor shaft which is rotated with the rotor shaft as one body, and a stator of cylindrical shape fixed to an inner surface of the frame structure coaxially with the rotor shaft with keeping a gap between an inner surface of the stator and an outer surface of the rotor. The frame structure is composed of a cylindrical frame with two side openings and a pair of brackets fixed to the cylindrical frame to cover respective one of the side openings, and the brackets are made of a material with excellent heat conductivity comprising at least one of aluminum, aluminum alloy, stainless steel, copper and copper alloy. The totally-enclosed traction motor for electric railcar further includes a plurality of heat absorbing fins fixed to one of the brackets from the inside, respectively, and a plurality of radiation fins fixed to one of the brackets from the outside, respectively.

According to still another aspect of this invention, there is provided a totally-enclosed traction motor for electric railcar including, a frame structure of totally-enclosed cylindrical shape, a rotor shaft rotatably supported to the frame structure coaxially with the frame structure, a rotor of cylindrical shape coaxially fixed to the rotor shaft which is rotated with the rotor shaft as one body, a stator of cylindrical shape fixed to an inner surface of the frame structure coaxially with the rotor shaft with keeping a gap between an inner surface of the stator and an outer surface of the rotor, an internal fan for air circulation fixed to the rotor shaft which is rotated with the rotor shaft as one body, and a cooler provided on an upper surface of the frame structure. The cooler is composed of a pair of connecting sections, a cooling pipe connected between the connecting sections and a plurality of cooling fins fixed to the cooling pipe. The frame structure is provided with a pair of breathers in an upper part of the frame structure. The connecting sections are fixed to the upper surface of the frame structure so as to cover respective one of the breathers.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
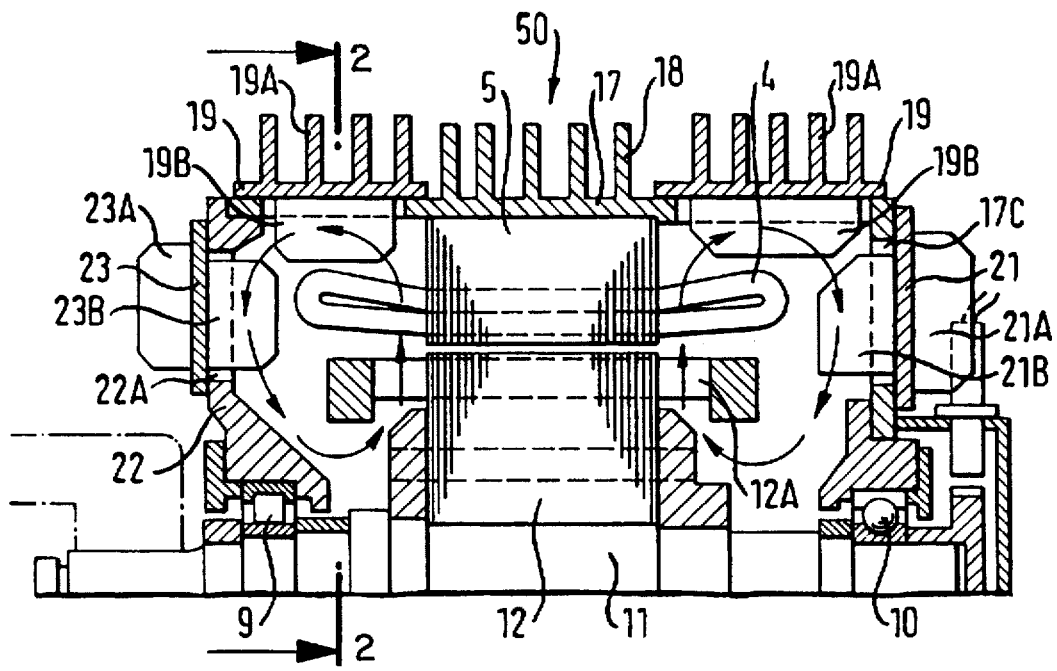
FIG. 1 is a half longitudinal sectional view showing a totally-enclosed self-cooled traction motor for electric railcar according to a first embodiment of this invention.

Referring now to the drawings, wherein like reference numerals designate identical or corresponding parts throughout the several views, the embodiments of this invention will be described below.

Figure 2:
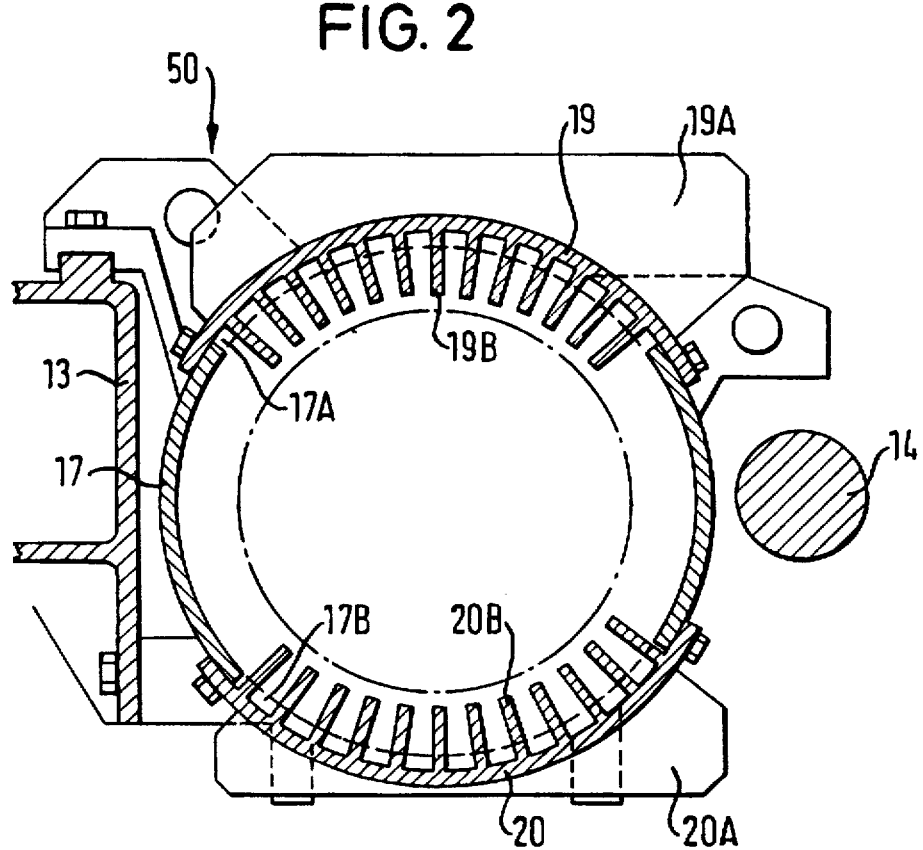
FIG. 2 is a side sectional view of the traction motor along a line A—A shown in FIG. 1.
Figure 3:
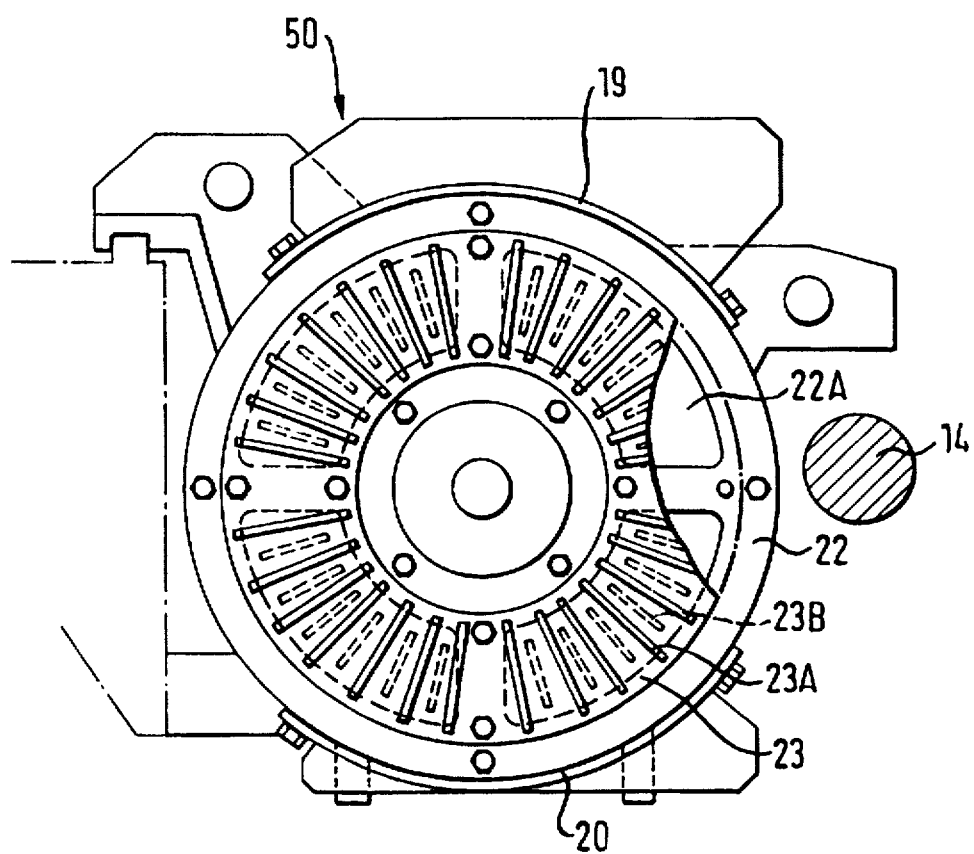
FIG. 3 is a side view of the traction motor shown in FIG. 1.
Figure 4:
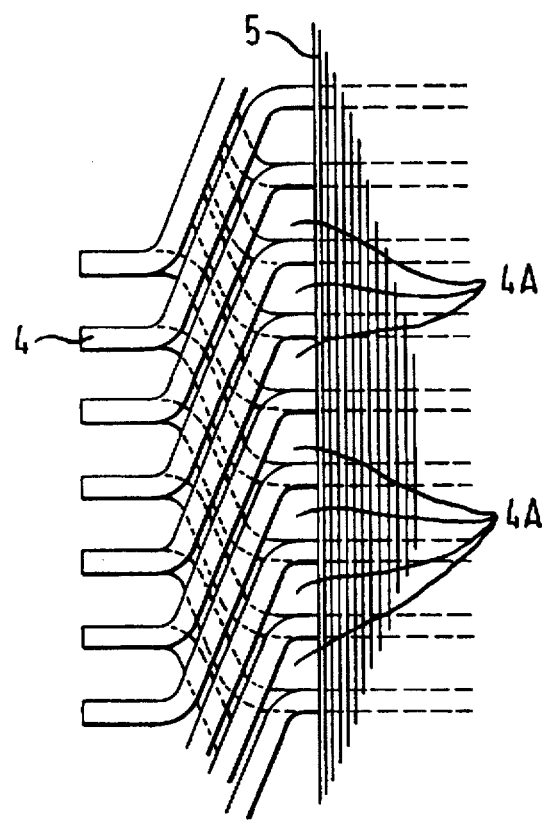
FIG. 4 is an expansion view seen from the inner circumference of the stator core and stator coil of the traction motor shown in FIG. 1.
Figure 5:
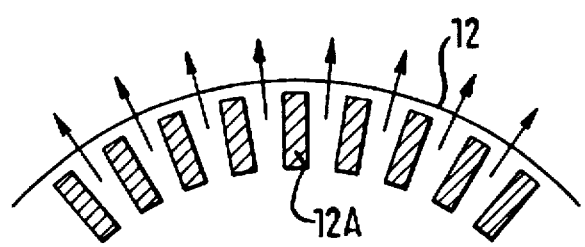
FIG. 5 is a local sectional view for the rotor of the traction motor shown in FIG. 1.
Figure 5:

Firstly, a first embodiment of this invention is described with reference to FIGS. 1-5. FIG. 1 is a half-sectional view in the longitudinal direction of a totally-enclosed self-cooled traction motor for an electric car according to a first embodiment of this invention. FIG. 2 is a side sectional view of the traction motor along a line A—A shown in FIG. 1. FIG. 3 is a side view of the traction motor shown in FIG. 1. FIG. 4 is an expansion view, seen from the inner circumference, of the stator core and stator coil of the traction motor shown in FIG. 1, and FIG. 5 is a local sectional view of the rotor of the traction motor shown in FIG. 1.

In these drawings, in a totally-enclosed traction motor 50 for an electric railcar, at the inner surface of a cylindrical frame 17, cylindrical stator core 5 is mounted. Stator coils 4 are arranged along the inner circumference of stator core 5. At both ends of frame 17 in the longitudinal direction, a bearing bracket 22 and bearing housing 8 are mounted. Rotor shaft 11 is rotatably supported by bearing bracket 22 and bearing housing 8 via bearings 9, 10 respectively mounted on them. Cylindrical rotor core 12 is fixed to rotor shaft 11 at the central position, and rotor bars 12 are arranged at the outer circumference of rotor core 11. As described above, this traction motor 50 composes a three-phase AC squirrel-cage induction motor as a whole.

At the central position of frame 17 at the inside of which stator core 5 is installed, a plurality of cooling fins 18 are provided as one body at the upper and lower sides of the outer circumference of frame 17. At the both ends of frame 17 in the longitudinal direction, upper opened windows 17A are provided at the upper side of frame 17. At the both ends of frame 17 in the longitudinal direction, lower opened windows 17B are provided at the lower side of frame 17. Upper cooling bodies 19 are provided so as to cover the openings of upper windows 17A, respectively. Further, lower cooling bodies 20 are provided so as to cover the openings of lower windows 17B, respectively.

In each of upper cooling bodies 19, a plurality of heat absorbing fins 19B are mounted thereto from the inside, and a plurality of radiation fins 19A are mounted thereto from the outside. Similarly, in each of lower cooling bodies 20, a plurality of heat absorbing fins 20B are mounted thereto from the inside, and a plurality of radiation fins 20A are mounted thereto from the outside. Upper and lower cooling bodies 19 and 20 with heat absorbing fins 19B and 20B and radiation fins 19A and 20A are respectively made of a material with excellent heat conductivity, such as aluminum alloy.

At the side of frame 17, a plurality of side opened windows 17C are provided. Side cooling bodies 21 are provided so as to cover the openings of side windows 17C, respectively. Further, at bearing bracket 22, a plurality of opened windows 22A are provided. Cooling bodies 23 are provided so as to cover the openings of windows 22A, respectively.

In each of side cooling bodies 21, a plurality of heat absorbing fins 21B are mounted thereto from the inside, and a plurality of radiation fins 21A are mounted thereto from the outside. Similarly, in each of cooling bodies 23, a plurality of heat absorbing fins 23B are mounted thereto from the inside, and a plurality of radiation fins 23A are mounted thereto from the outside. Side cooling bodies 21 and cooling bodies 23 provided with heat absorbing fins 21B and 23B and radiation fins 21A and 23A are also respectively made of a material with excellent heat conductivity, such as aluminum alloy.

When traction motor 50 is operating, the rotor rotates, and as a result, the air inside traction motor 50 is blown out from the circumference of rotor core 12 as shown in FIG. 5 by the fan action of rotor bars 12A arranged at the outer circumference of rotor core 12 with the end portions respectively projecting from rotor core 12. As shown in FIG. 4, stator coils 4 installed in the slots of stator core 5 are arranged such that stator coils 4 intersect with each other at the outside of stator core 5. As a result, near the end portions of stator core 5, a plurality of air paths 4A are formed between stator coils 4, respectively. The air blown out from rotor core 12 as described above flows up along air paths 4A between stator coils 4, and circulates in traction motor 50 as shown by arrows in FIG. 1.

As a plurality of heat absorbing fins 19B, 20B, 21B and 23B respectively provided on cooling bodies 19, 20, 21 and 23 are arranged along the paths of the circulating air, the heat of the circulating air is absorbed effectively by these heat absorbing fins 19B, 20B, 21B and 23B. The heat transmitted to cooling bodies 19, 20, 21 and 23 from respective heat absorbing fins 19B, 20B, 21B and 23B are radiated to the outside of traction motor 50 by radiation fins 19A, 20A, 21A and 23A respectively provided on the outsides of cooling bodies 19, 20, 21 and 23. When the electric train is running, as the running air flows around radiation fins 19A, 20A, 21A and 23A of traction motor 50, the radiation of the heat from radiation fins 19A, 20A, 21A and 23A is executed effectively. Furthermore, as cooling bodies 19, 20, 21 and 23 are made of materials with excellent heat conductivity, such as aluminum alloy, the cooling effect of traction motor 50 further increases.

As described above, according to this embodiment, the air inside traction motor 50 is effectively cooled. In addition, as this embodiment is constructed such that the air inside traction motor 50 always circulates, the cooling of the components in traction motor 50 are uniformly executed. As a result, the temperature rise of traction motor 50 is suppressed.

According to this embodiment it is possible to provide a totally-enclosed traction motor for an electric railcar which can improve the cooling effect of the traction motor and can achieve downsizing and light weight of the traction motor. Furthermore, it is possible to provide a totally-enclosed traction motor for an electric railcar which can be installed in a limited space of an electric railcar without reducing the output capacity of the traction motor. It is also possible to provide a totally-enclosed traction motor for an electric railcar which can prevent the contamination in the traction motor by the introduced outer air, can eliminate the periodical maintenance of the traction motor, and can reduce the noise generated by the traction motor.

Figure 6:
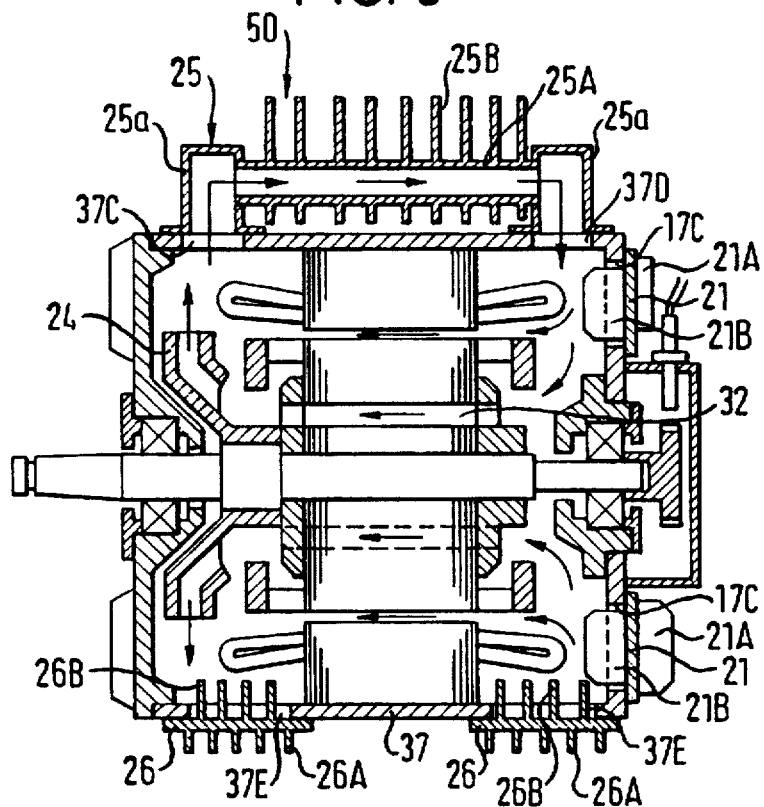
FIG. 6 is a longitudinal sectional view showing a totally-enclosed self-cooled traction motor for electric railcar according to a second embodiment of this invention.

Next, a second embodiment of this invention is described with reference to FIGS. 6 and 7. FIG. 6 is a half-sectional view in the longitudinal direction of a totally-enclosed self-cooled traction motor for an electric railcar according to a second embodiment of this invention, and FIG. 7 is a side view of the traction motor shown in FIG. 6.

Figure 7:
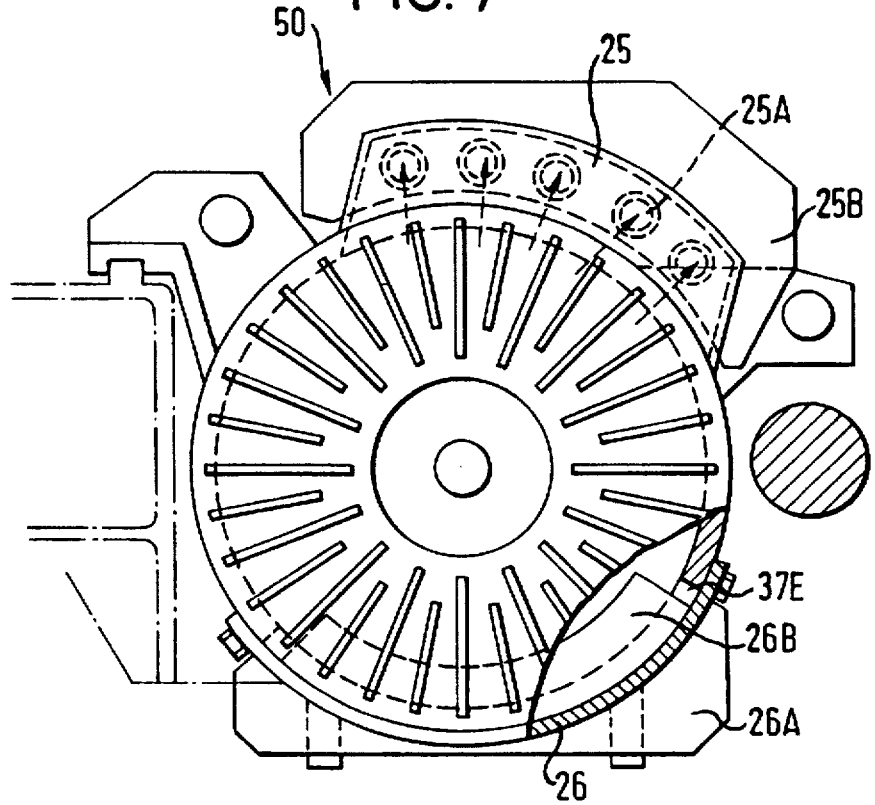
FIG. 7 is a side view of the traction motor shown in FIG. 6.

In FIGS. 6 and 7, at the top portion of a cylindrical frame 37 of traction motor 50 according to this invention, an air outlet 37C and an air inlet 37D are provided, and at the upper outer surface of traction motor 50, a cooling unit 25 is fixed to frame 37. Cooling unit 25 is composed of a pair of connecting sections 25a, a plurality of cooling pipes 25A connected between connecting sections 25a and a plurality of cooling fins 25B mounted on the peripheries of cooling pipes 25A. First ends of cooling pipes 25A are connected to the inside of the traction motor via air outlet 37C by fixing connecting section 25a to the upper surface of frame 37 to cover air outlet 37C. The other ends of cooling pipes 25A are connected to the inside of the traction motor via air inlet 37D by fixing connecting section 25a to the upper surface of frame 37 to cover air inlet 37D. At the lower part of frame 37, two windows 37E are provided, and two cooling bodies 26 are provided so as to cover a respective one of windows 37E. In each of cooling bodies 26, a plurality of heat absorbing fins 26B are mounted thereto from the inside, and a plurality of radiation fins 26A are mounted thereto from the outside.

At the side of frame 37, a plurality of side windows 17C are provided. Side cooling bodies 21 are provided so as to cover the opening of side windows 17C, respectively. In each of cooling bodies 21, a plurality of heat absorbing fins 21B are mounted thereto from the inside, and a plurality of radiation fins 21A are mounted thereto from the outside.

A fan 24 for air circulation is fixed to rotor shaft 11, and a plurality of air holes 32 are provided in rotor core 5 along the axial direction.

When traction motor 50 is operating, the air inside the traction motor 50 is sent into cooling unit 25 through air outlet 37C by the rotation of fan 24 mounted on rotor shaft 11. When the air passes through cooling pipes 25A, the air is cooled and then sent inside traction motor 50 through air inlet 37D. The returned air passes through air holes 32 provided in rotor core 12 and a gap between the outer surface of rotor core 12 and the inner surface of stator core 5, and then the air is sent to fan 24. As described above, the air inside traction motor 50 circulates inside traction motor 50 by fan 24 as shown by arrows in FIG. 6. The air is also cooled by cooling bodies 21, 26 during the circulation.

As described above, according to this embodiment, the air inside traction motor 50 is effectively cooled. In addition, as this embodiment is constructed such that the air inside the traction motor always circulates, the cooling of the components in traction motor 50 are uniformly executed. As a result, the temperature rise of traction motor 50 is suppressed.

In a case of installing the traction motor in an electric railcar, compared with the usable upper space of the traction motor, the lower space of the traction motor is restricted by the electric railcar limit. Accordingly, it is impossible to install a comparably large cooling unit, such as cooling unit 25, in the lower part of the traction motor. In this embodiment, however, cooling bodies 26 are provided in the lower part of the traction motor which is smaller in size than cooling unit 25 provided in the upper part of the traction motor, and side cooling bodies 21 are further provided on the side of the traction motor 50. According to this embodiment, in addition to the effect of the first embodiment, it is further possible to raise the cooling effect of the traction motor largely.

Figure 8:
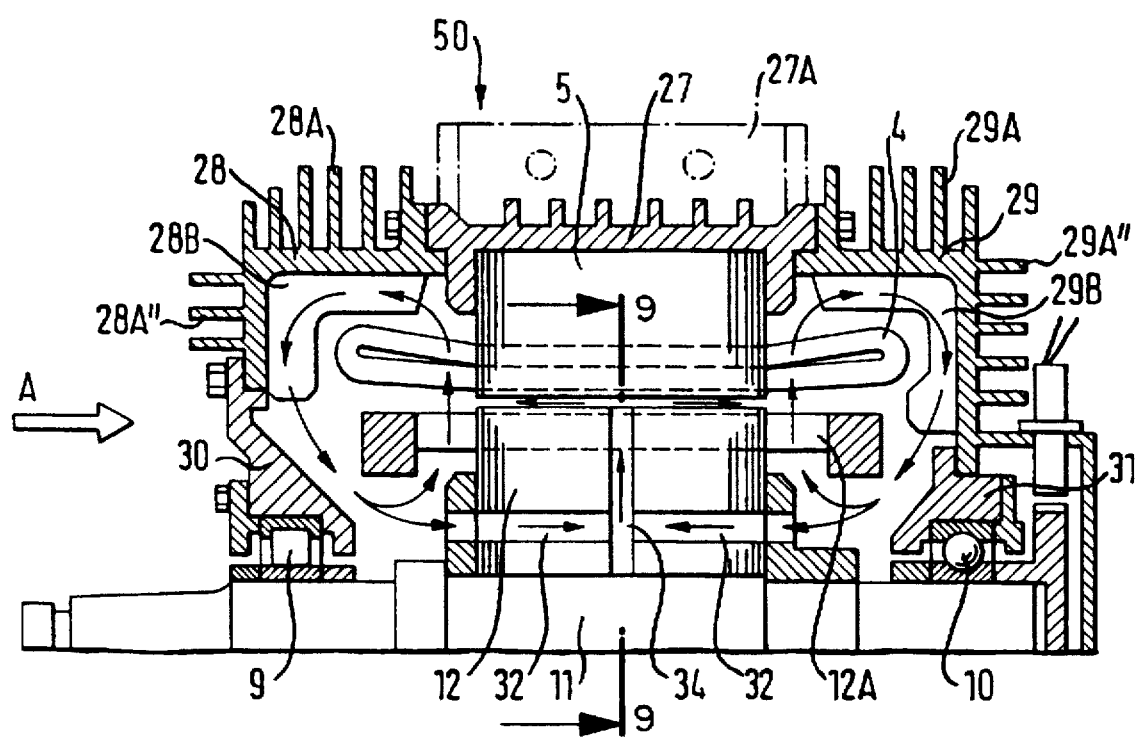
FIG. 8 is a half longitudinal sectional view showing a totally-enclosed self-cooled traction motor for electric railcar according to a third embodiment of this invention.
Figure 9:
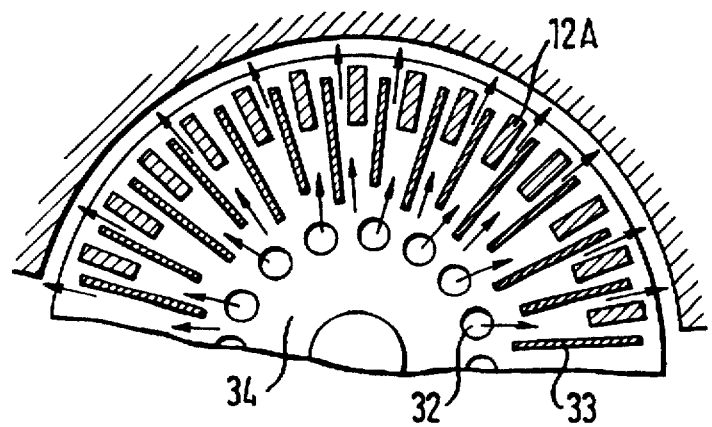
FIG. 9 is a local sectional view of the traction motor shown in FIG. 8.
Figure 10:
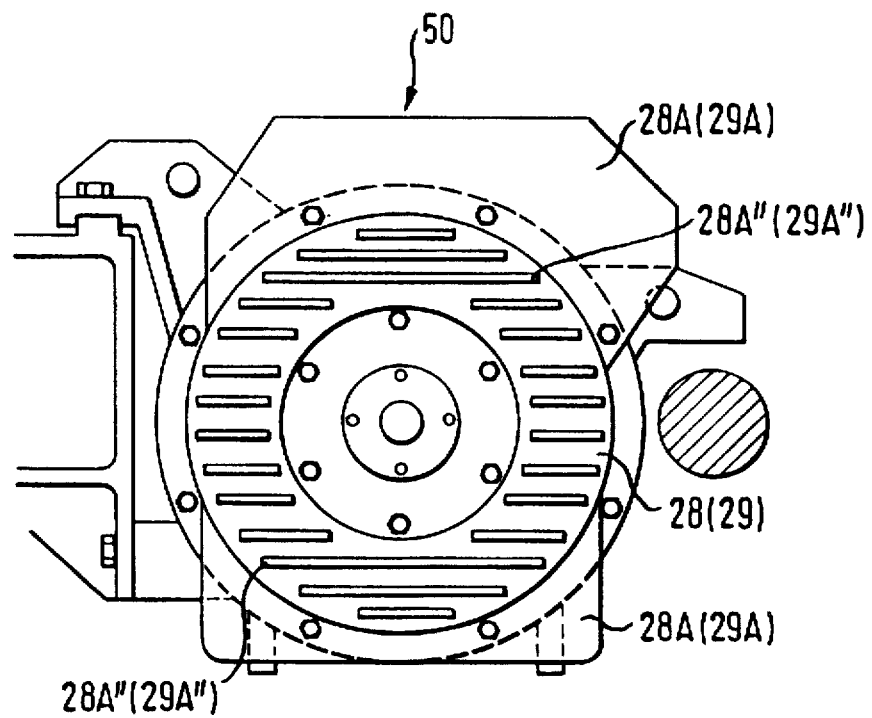
FIG. 10 is a view of the traction motor in the direction of the arrow A in FIG. 8

Next, a third embodiment of this invention is described with reference to FIGS. 8, 9 and 10. FIG. 8 is a half-sectional view in the longitudinal direction of a totally-enclosed self-cooled traction motor for an electric railcar according to a third embodiment of this invention, FIG. 9 is a side sectional view of the traction motor along a line B—B shown in FIG. 8, and FIG. 10 is a view of the traction motor in the direction of the arrow A in FIG. 8

In these drawings, a totally-enclosed self-cooled traction motor 50 for an electric railcar according to this embodiment is provided with a cylindrical frame 27 having approximately the same length in the longitudinal direction as that of stator core 5. A mounting arm 27A provided on frame 27 supports the bogie of the electric railcar. At both ends of frame 27 in the longitudinal direction, brackets 28 and 29 are arranged, which are fixed to frame 27 by bolts to cover both-side openings of cylindrical frame 27, respectively.

In brackets 28 and 29, a plurality of heat absorbing fins 28B and 29B are mounted thereto from the inside, and a plurality of radiation fins 28A and 29A are mounted thereto from the outside, respectively. Brackets 28 and 29 along with heat absorbing fins 28B and 29B and radiation fins 28A and 29A are made of materials with excellent heat conductivity, such as aluminum alloy. Here, in FIGS. 8 and 10, radiation fins 28A and 29A provided on the side surfaces of brackets 28 and 29 are especially given reference numerals 28A" and 29A", respectively.

At inner positions of brackets 28 and 29 in the radial direction, a bearing bracket 30 and a bearing housing 31 are fixed to brackets 28 and 29, respectively. A rotor shaft 11 is rotatably supported to bearing bracket 30 and bearing housing 31 via bearings 9 and 10, respectively mounted on them.

In rotor core 12, there are provided a plurality of air holes 32 in the longitudinal direction as shown in FIGS. 8 and 9. At the outer circumference of rotor core 12, a plurality of rotor bars 12A are mounted thereto. In the central position of rotor core 12, there is provided in the longitudinal direction thereof an air duct 34 defined by a plurality of spacers 33.

When traction motor 50 is operating, the rotor rotates, and as a result, the air inside traction motor 50 is blown out from the circumference of rotor core 12 as shown in FIG. 9 by the fan action of rotor bars 12A. At the same time, the air inside air duct 34 is also blown out from the circumference of rotor core 12 as shown in FIG. 9 by the fan action of spacers 33 provided in the central position of rotor core 12. The air blown out from the rotor circulates through the flow route from air paths 4A of stator coil 4 shown in FIG. 4, through inner circumferences of brackets 28 and 29, and to the inside of the rotor, as shown by arrows in FIG. 8. As a plurality of heat absorbing fins 28B and 29B are arranged along the paths of the circulating air, the heat of the circulating air is absorbed effectively by these heat absorbing fins 28B and 29B. The heat transmitted to brackets 28, 29 from heat absorbing fins 28B and 29B is radiated to the outside of traction motor 50 by radiation fins 28A and 29A.

According to this embodiment, as brackets 28, 29 are made of materials with excellent heat conductivity, such as aluminum alloy, the cooling effect of the traction motor of this embodiment is excellent. Furthermore, as the air circulates inside the traction motor with effectively contacting heat absorbing fins 28B and 29B, the cooling effect is more improved.

As the air circulates through the central portion of rotor core 12 in the longitudinal direction, where the temperature is the highest of all traction motor 50, the cooling effect of traction motor 50 is further improved.

In addition, as brackets 28, 29 are made of a material with excellent heat conductivity, such as aluminum alloy, the increase in the weight of traction motor 50 can be made smaller even though a plurality of cooling fins 28A, 28B, 29A and 29B are provided in traction motor 50 as in this embodiment. Accordingly, in addition to the effect of the first embodiment, it is possible to obtain a totally-enclosed self-cooled traction motor for an electric railcar capable of achieving light weight according to this embodiment.

Figure 11:
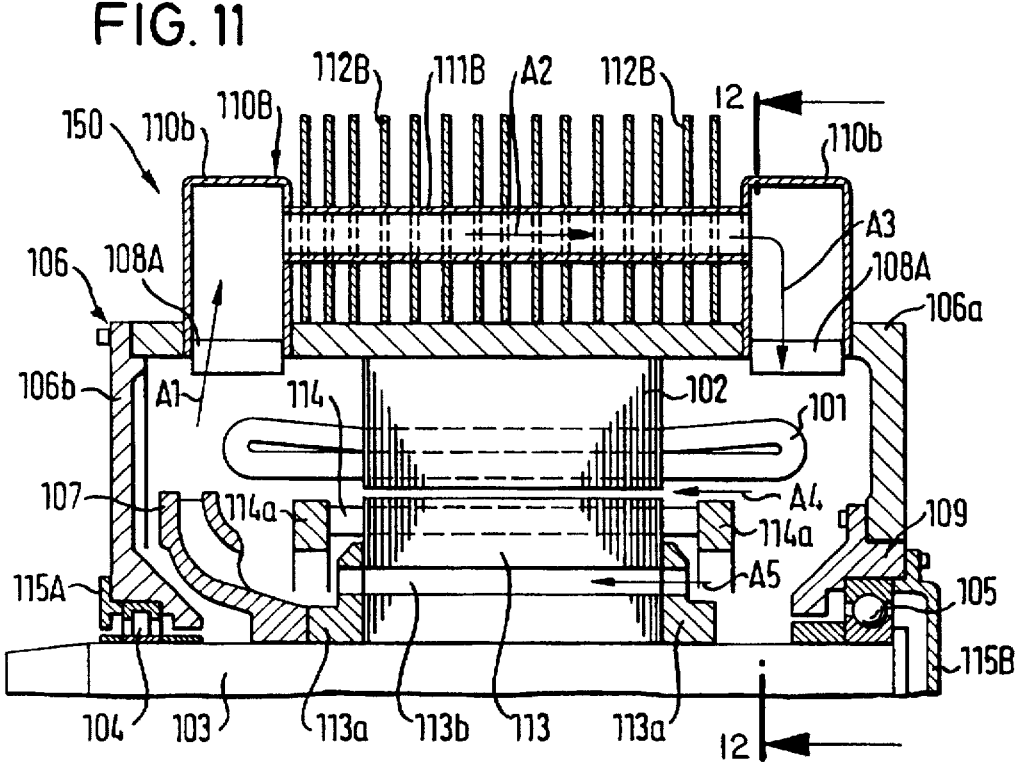
FIG. 11 is a half longitudinal sectional view showing a totally-enclosed traction motor for electric railcar according to a fourth embodiment of this invention.
Figure 12:
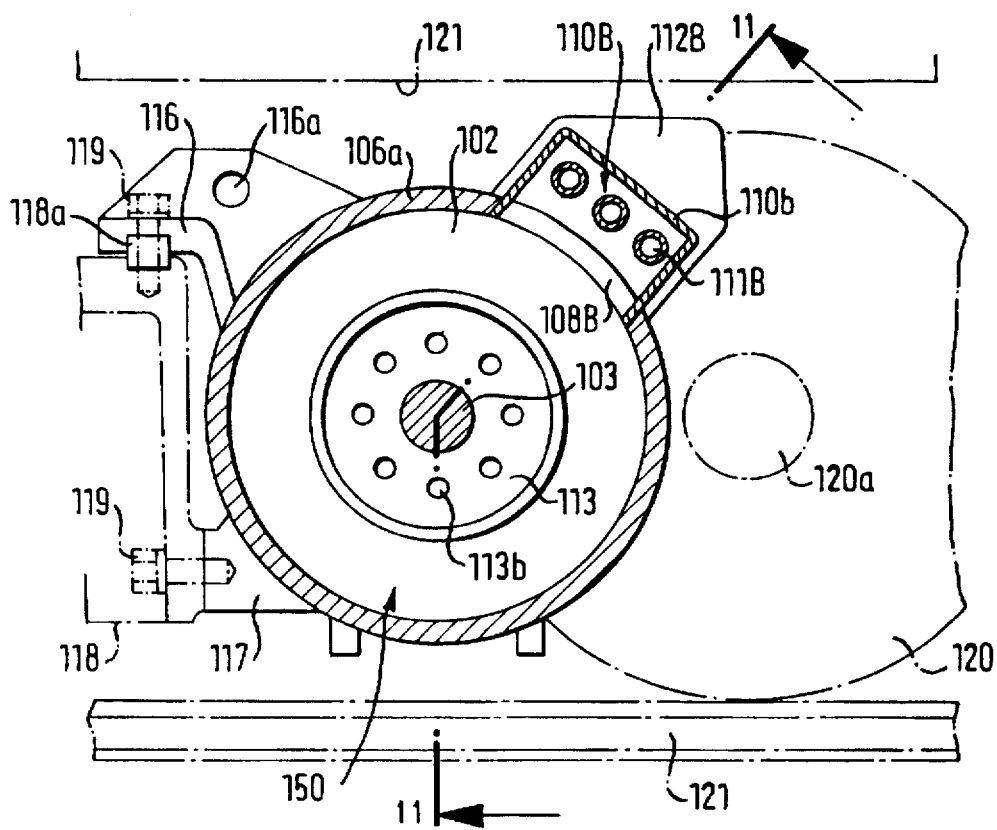
FIG. 12 is a side sectional view of the traction motor along a line C—C shown in FIG. 11.

FIG. 11 is a half longitudinal sectional view showing a totally-enclosed traction motor 150 according to a fourth embodiment of this invention, which is a squirrel-cage induction motor. Further, FIG. 12 is a side sectional view of traction motor 150 along a line C—C shown in FIG. 11. Strictly speaking, FIG. 11 is a view of traction motor 150 along a line A—A shown in FIG. 12.

In FIGS. 11 and 12, there is provided a cylinder frame 106a of traction motor 150 formed in an almost U-shaped cross-section made of a mild steel plate. An outer circumferential fitting section of a side frame 106b; which is in a disk shape in a left side view (not shown), is mounted and fixed to the left end that becomes an open side of cylinder frame 106a fixed with a plurality of bolts (not shown). A main frame 106 is composed of this side frame 106b and cylinder frame 106a.

There are breathers 108A, 108B formed at the upper right side in FIG. 12, which are in a rectangular cross-section and formed at the left and right sides of the upper end of cylinder frame 106a in FIG. 11. There are provided connecting sections 110b formed in reverse U-shaped cross-section made of mild steel plate. Lower open ends of connecting sections 110b are respectively inserted into and welded to breathers 108A, 108B. Connecting sections 110b serve as the entrances of a cooler 110B, respectively.

Both ends of three steel made air pipes 111B are penetrating the opposite sides of left and right connecting sections 110b and welded to connecting sections 110b, respectively. A plurality of cooling fins 112B made of thin mild steel plate in an arrow shape are installed at equal spaces on air pipes 111B such that air pipes 111B penetrate a plurality of cooling fins 112B, respectively.

Cooling fins 112B are welded to three air pipes 111B and the lower ends thereof are welded to the top of cylinder frame 106a.

At the middle of the right end of cylinder frame 106a, a bearing plate 109 is inserted in advance from the inside. To the inner surface of bearing plate 109, a ball bearing 105 is press fitted from the outside. Similarly, at the middle of side frame 106b, a roller bearing 104 is press fitted from the left side.

The roller bearing 105 and ball bearing 104 are press fitted to a rotor shaft 103 in advance. Of these bearings, roller bearing 104 at the left side is fixed by a bearing retainer 115A whose inside is fitted to the middle of side frame 106b from the left side and ball bearing 105 at the right side is fixed by a bearing retainer 115B whose left side is fitted to the inner surface of bearing plate 109.

A rotor core 113 is provided such that rotor shaft 103 is inserted into rotor core 113. Both sides of rotor core 113 are fixed by core retainers 113a that are fitted to rotor shaft 103 from both sides. Eight air holes 113b are formed in the axial direction in rotor core 113 at intervals of 45° as shown in FIG. 12.

At the further left side of core retainer 113a at the left side, an internal fan 107 is press fitted to rotor shaft 103 from the left side and fixed there. A plurality of rotor bars 114 are inserted into respective slots (not shown) formed on the outer surface of rotor core 113, and both ends of these rotor bars 114 are respectively connected by end rings 114a.

On the other hand, at the middle of the inner surface of cylinder frame 106a, a stator core 102 is press fitted. A plurality of stator coils 101 are respectively inserted into slots formed in the axial direction in the inner surface of stator core 102. The coil ends at both ends of stator coils 101 project from both sides of stator core 102, respectively.

At the upper left side of cylinder frame 106a, an upper mounting seat 116 is welded to cylinder frame 106a, as shown in FIG. 12. Similarly, at the lower left side of cylinder frame 106a, a lower mounting seat 117 is welded to cylinder frame 106a as shown in FIG. 12 at the position of the underside of upper mounting seat 116.

In FIG. 12, of these mounting seats 116, 117, upper mounting seat 116 is installed on the top of a bogie beam 118 via a key 118a and fixed there by a bolt 119. On the other hand, lower mounting seat 117 at the underside is fixed to the lower side of bogie beam 118 by a bolt 119.

Further, a hanging hook hole 116a is provided in upper mounting seat 116. A wheel 120 and an axle 120a of the bogie are shown by the one-dotted chain line on the right side of cylinder frame 106a of traction motor 150, a rail 121 is shown at the lower end of wheel 120, and a car body 123 is shown above wheel 120.

Figure 13:
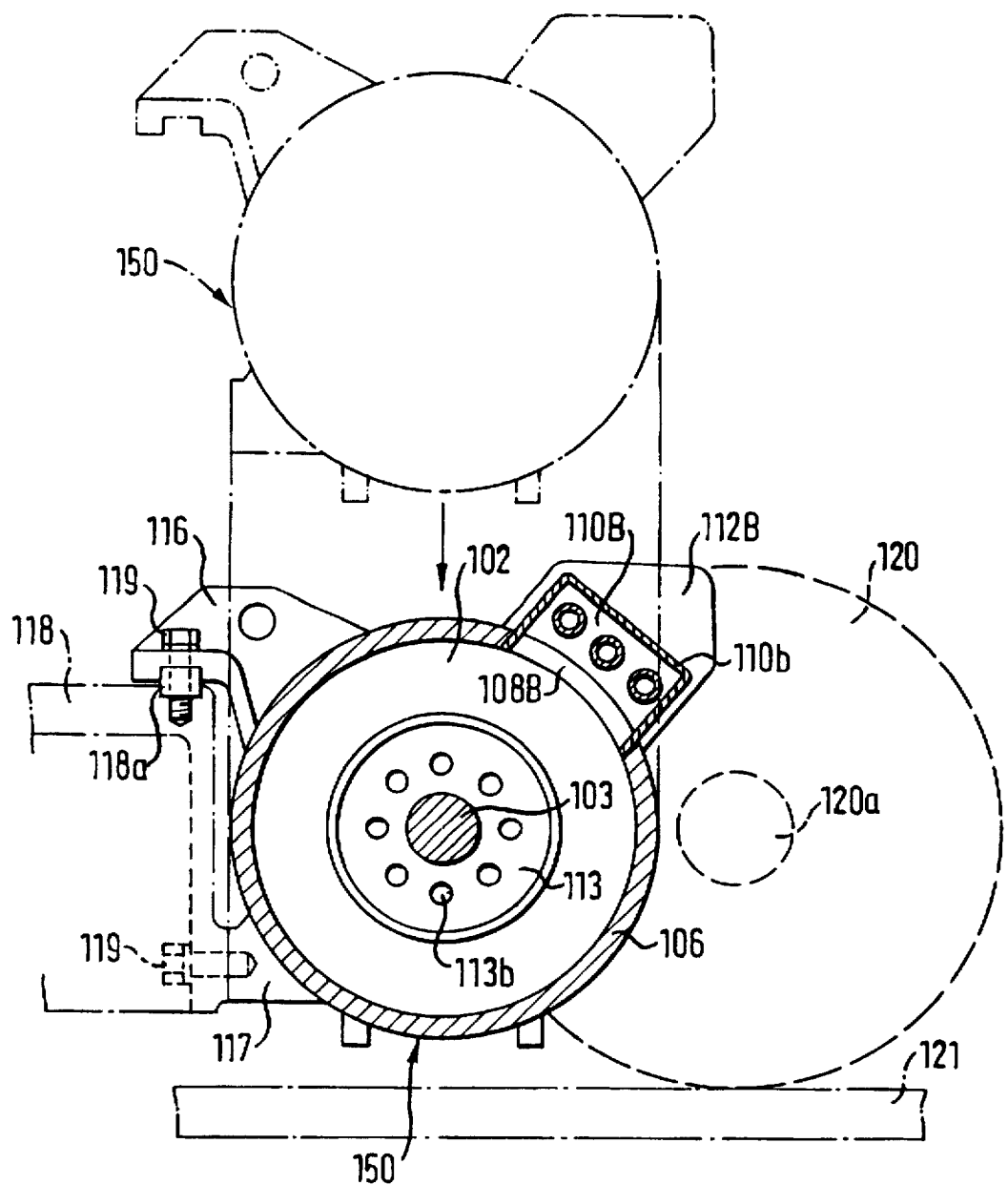
FIG. 13 is an explanatory diagram showing the assembling procedure of the traction motor shown in FIG. 11.

In totally-enclosed traction motor 150 for an electric railcar in the construction as described above, to incorporate this totally-enclosed traction motor 150 in a bogie, it is lowered gradually from the above of a bogie, upper mounting seat 116 is put on the top of bogie beam 118 via a key 118a and upper mounting seat 116 and lower mounting seat 117 are fixed to beam 118 by bolts 119 as shown in FIG. 13.

Further, when inspecting totally-enclosed traction motor 150 for the periodic inspection, after separating a bogie from car body 123, bolts 19 are loosened and traction motor 150 is lifted upward using hook hole 116a as shown by the one-dotted chain line in FIG. 13.

Further, in the installed state shown by the solid line in FIG. 13, this totally-enclosed traction motor 150 for an electric railcar is arranged between beam 118 at the left side and axle 120a at the right side. As for the axial direction, it is positioned between both side wheels 120. The lower end of car body 123 is opposed to traction motor 150 at the above, and the lower side of traction motor 150 is opposed to rail 121. Thus, traction motor 150 is incorporated in a limited space.

When an electric railcar is running, internal fan 107 is also rotated by the rotation of rotor shaft 103, and air is forced to flow into connecting section 110b of cooler 110B by this internal fan 107 through breather 108A of cylinder frame 106a as shown by an arrow A1 in FIG. 11. After flowing through the inside of each of three air pipes 111B from this connecting section 110b as shown by an arrow A2, the air flows out to connecting section 110b at the right side.

This cooled air flows into the inside of cylinder frame 106a through breather 108B from connecting section 110b at the right side as shown by an arrow A3. Then, part of this cooled air is sucked in by internal fan 107 through a space formed between the inner surface of stator core 102 and the outer surface of rotor core 113 as shown by an arrow A4.

Further, another part of this cooled air flowed into the inside of cylinder frame 106a flows through each of air holes 113b formed on rotor core 113 to the left, and is sucked in by internal fan 107, similarly. Thus, air circulates inside cylinder frame 106a as shown by arrows A1-A2-A3-A4-A5 in that order, as shown in FIG. 11.

By this circulating cooled air, stator core 102 and stator coils 101 as well as rotor core 113 and rotor bars 114 are cooled.

By the way, in a case of a totally-enclosed traction motor that is incorporated in an electric railcar such as this, it is demanded to achieve a low price electric train by reducing the number of traction motors installed per train. Therefore, the power-up of output per traction motor is demanded and downsizing is also demanded for installing in a limited space as described above. Furthermore, light weight is also demanded for achieving high speed of train.

According to this embodiment, it is, therefore, possible to obtain a totally-enclosed traction motor for electric railcar capable of achieving downsizing, light weight and improving of ratings.

On totally-enclosed traction motor 150 for an electric railcar according to the fourth embodiment of this invention with the construction as described above, stator core 102 and stator coils 101 are effectively cooled, as heat is transferred from the outer surface of stator core 102 to cooling fins 112B via cylinder frame 106a. But rotor core 113 and rotor bars 114 are cooled only by the cooling wind shown by arrows A4, A5 and therefore, their cooling effect is lower than the stator side.

For instance, according to the result of a measurement conducted by the inventor, the difference between the temperature of rotor bars 114 and that of stator coils 101 is maximum about 40° C. when running in the summer season, and the temperature of rotor bars 114 is higher than that of stator coil 101.

The upper limit of the rated output of this totally-enclosed traction motor 150 for electric railcar is decided by a value of temperature rise of rotor bars 114.

Accordingly, it is still expected to provide a totally-enclosed traction motor for an electric railcar capable of further achieving downsizing, light weight and improving of rating, by suppressing the temperature rise of the rotor side.

In order to meet such expectation, a fifth embodiment of this invention is provided.

Hereafter, a totally-enclosed traction motor for electric railcar according to a fifth embodiment of this invention will be described referring to the attached drawings.

Figure 14:
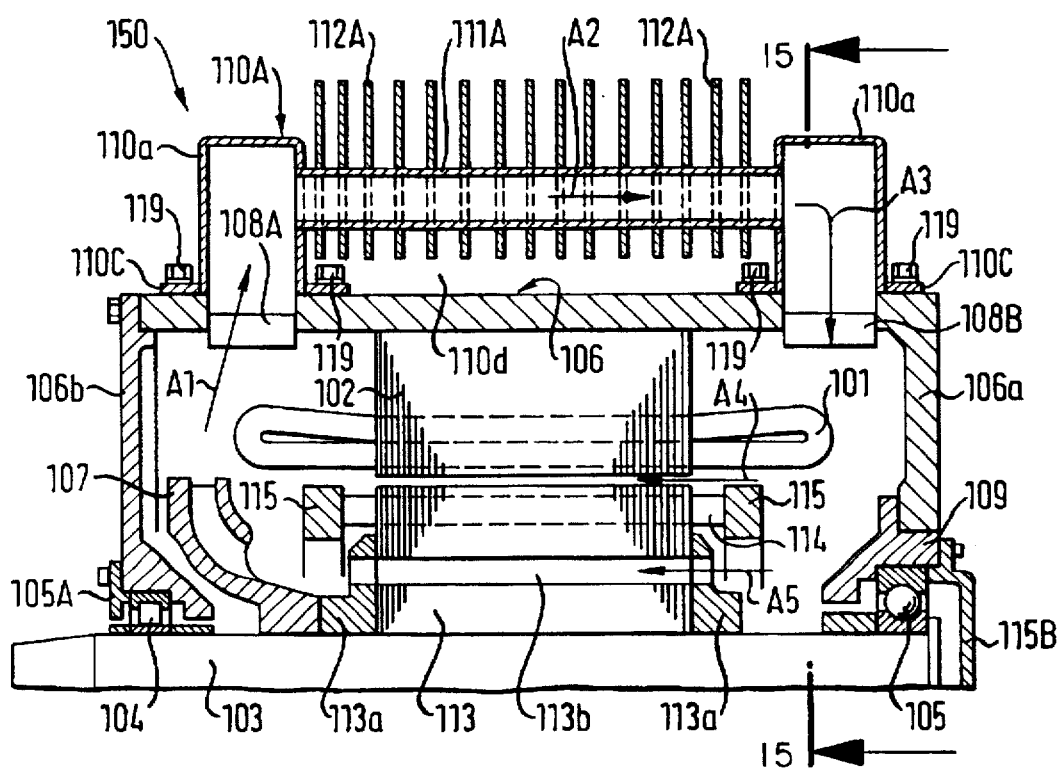
FIG. 14 is a half longitudinal sectional view showing a totally-enclosed traction motor for electric railcar according to a fifth embodiment of this invention.
Figure 15:
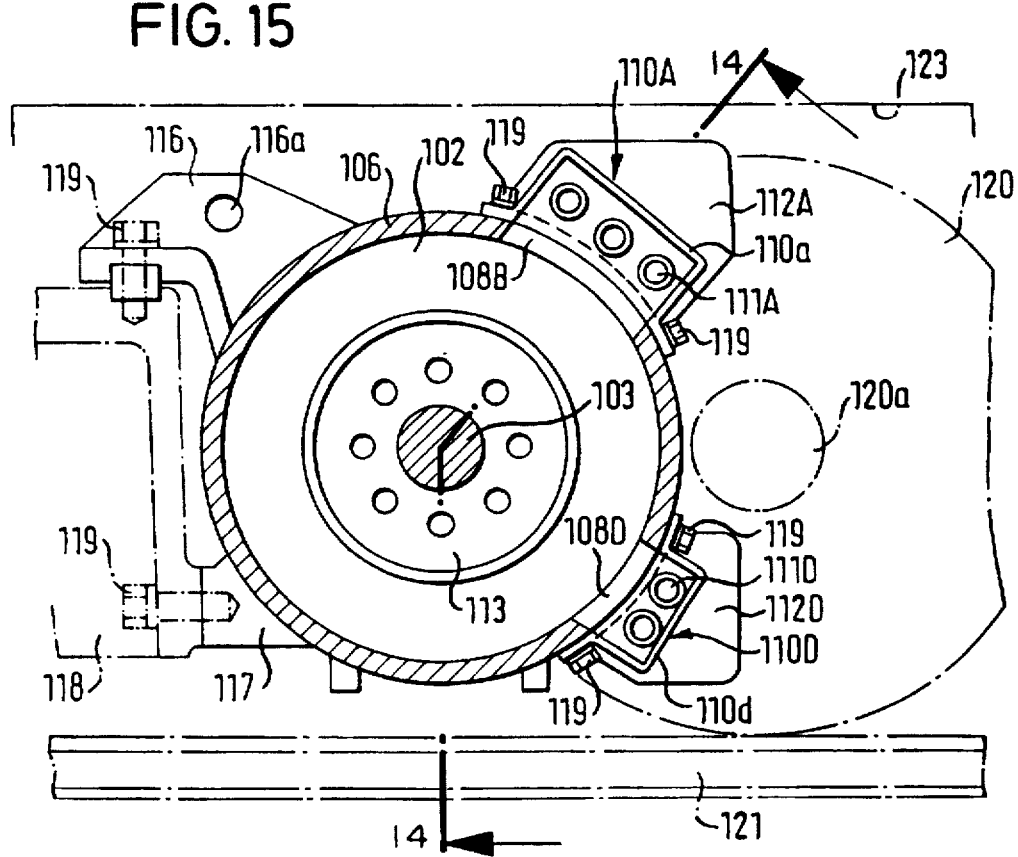
FIG. 15 is a side sectional view of the traction motor along a line B—B shown in FIG. 14.

FIG. 14 is a half longitudinal sectional view showing a totally-enclosed traction motor 150 according to a fifth embodiment of this invention, which is a squirrel-cage induction motor. Further, FIG. 15 is a side sectional view of traction motor 150 along a line B—B shown in FIG. 14 strictly speaking, FIG. 14 is a view of traction motor 150 along a line A—A shown in FIG. 15. Here, FIGS. 14 and 15 respectively correspond to FIGS. 11 and 12 showing the fourth embodiment of this invention.

In FIG. 14 and FIG. 15, what are differing from FIG. 11 and FIG. 12 according to the fourth embodiment are the construction and the number of coolers and all others are the same as FIG. 11 and FIG. 12. Therefore, the same component elements as those shown in FIG. 11 and FIG. 12 are assigned with the same reference numerals and the explanation thereof will be omitted.

In FIGS. 14 and 15, there are provided breathers 108A, 108B formed at both sides in the upper axial direction on cylinder frame 106a in the same way as the fourth embodiment. In addition, a slightly narrow opening 108D is formed at the lower right side (at wheel 120 side) as shown in FIG. 15, and an opening 108C with the same construction as opening 108D is formed at the underside of breather 108A in FIG. 14 symmetrically with respect to opening 108D.

Aluminum alloy made flange section 110c is provided and is welded to all around of the lower end of each of aluminum alloy made connecting section 110a. At breathers 8A, BB, aluminum alloy made connecting sections 110a are respectively fixed to cylinder frame 106a by bolts 119 at breathers 108A, 108B through aluminum alloy made flange sections 110C.

At the opposite side of these connecting sections 110a, three aluminum alloy made air pipes 111A are connected. To the air pipes 11A, a plurality of cooling fins 112A made of aluminum alloy plate in an arrow shape are installed and welded. Lower ends of cooling fins 112A are shorter than those of cooling fins 112B shown in FIG. 11.

A cooler 110A is composed of connecting sections 110a and three aluminum alloy made air pipes 111A with a plurality of cooling fins 112A, and connecting sections 110a serve as the entrance of cooler 110A, respectively. As a result, a small space 110d is formed between the lower ends of cooling fins 112A and the outer surface of cylinder frame 106a. Similarly, a small cooler 110D provided with two connecting sections 110d, two air pipes 111D with small cooling fins 112D is fixed to openings 108C, 108D by bolts 119.

In totally-enclosed traction motor 150 for an electric railcar in such a construction, cooling air is circulated as shown by arrows A1, A2, A3, A4 and A5 by internal fan 107 in the same manner as in FIG. 11, and is heated by the rotor and the stator. The heated air is, then, cooled during the process to flow through air pipes 111A of cooler 110A. Similarly, the heated air is cooled during the process to flow through air pipes 111D of cooler 110D.

Here, as cooling fins 112A to cool air pipes 111A are not connected to cylinder frame 106a at their lower ends, so that the heat transfer from stator core 102 is intercepted, and it is possible to prevent the heat transfer from stator core 102. Accordingly, coupled with addition of the cooling by cooler 110D at the underside, this embodiment can reduce the temperature rise of the cooling air.

In detail, it is possible to lower the temperature of cooling air flowing into the inside of cylinder frame 106a as shown by arrow A3 and to lower the temperature of cooling air flowing from the right to the left in FIG. 14 as shown by arrows A4 and A5. For instance, according to the result of a measurement conducted by the inventor, the difference between the temperature of rotor bars 114 and that of stator coils 101 is maximum about 20° C. when running in the summer season. Accordingly, the temperature at the rotor side that becomes higher than the stator side in traction motor 150 can be lowered by 20° C. than that in traction motor 150 shown in FIG. 11.

Figure 16:
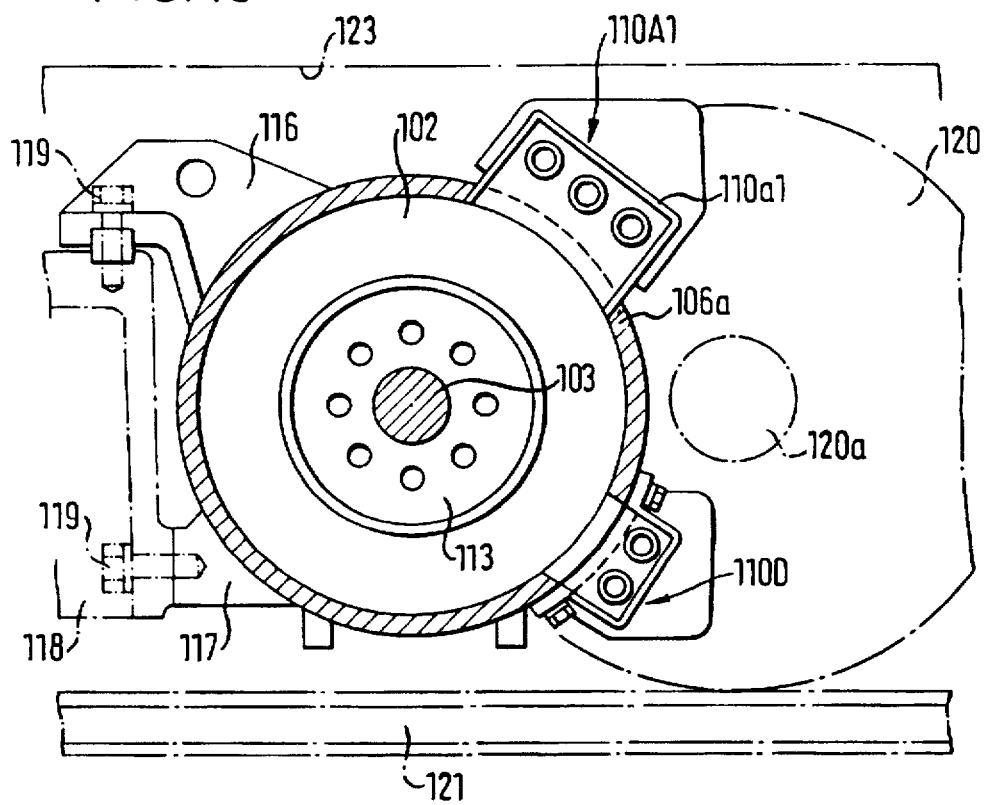
FIG. 16 is a side sectional view of a totally-enclosed traction motor for electric railcar according to a sixth embodiment of this invention, corresponding to FIG. 15.

Then, FIG. 16 is a side sectional view showing a totally-enclosed traction motor 150 for an electric railcar according to a sixth embodiment of the present invention, corresponding to FIG. 15.

In FIG. 16, what is differing from FIG. 15 is that connecting sections 110a1 of a cooler 110A1 at the upper side are welded and fixed to cylinder frame 106a.

In totally-enclosed traction motor 150 for an electric railcar in such a construction, when incorporating this totally-enclosed traction motor 150 into a bogie as shown in FIG. 13, cooler 110D at the underside is removed from the main body of traction motor 150, and then traction motor 150 is fixed to the beam of the bogie by bolts 119. After that, cooler 110D is fixed to the main body of totally-enclosed traction motor 150 for electric railcar by bolts 119 in the same manner as shown in FIG. 14 and FIG. 15.

Accordingly, upper side cooler 10A1 does not require a fastening work by bolts 119, which is a merit that the fastening work can be omitted, and therefore inspection work also can be omitted for loose bolts in the maintenance and inspection.

Further, the installation of lower side cooler 110D is not limited to the fastening by bolts 119. The lower side cooler may be in such a construction that it can be installed after incorporating a totally-enclosed traction motor for an electric railcar to the bogie.

Figure 17:
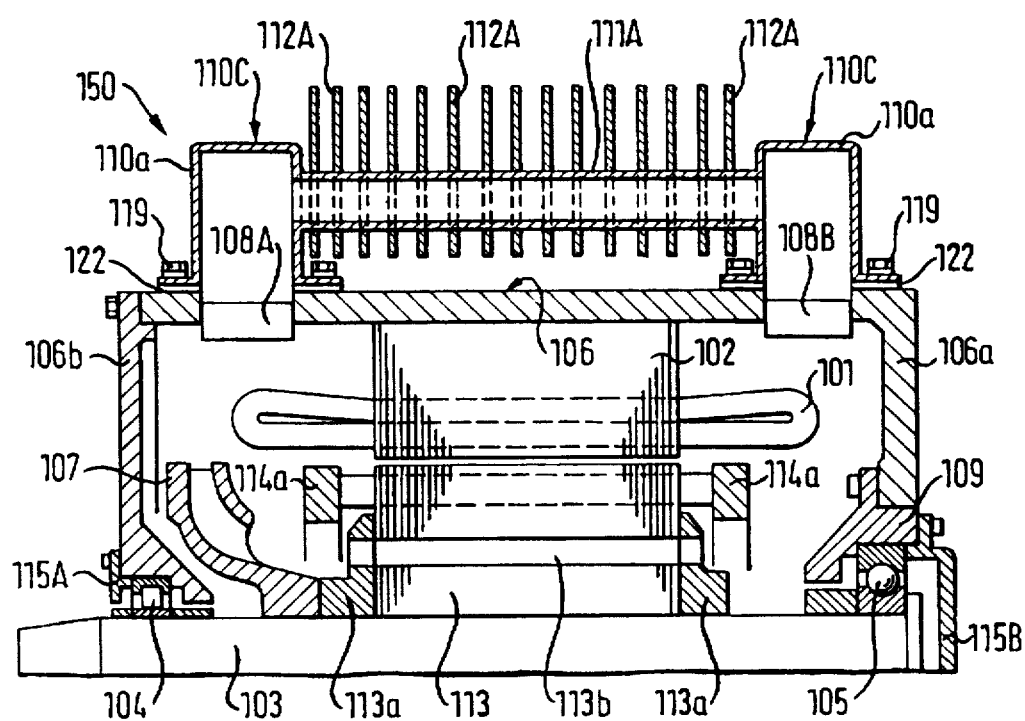
FIG. 17 is a half longitudinal sectional view showing a totally-enclosed traction motor for electric railcar according to a seventh embodiment of this invention.
Figure 18:
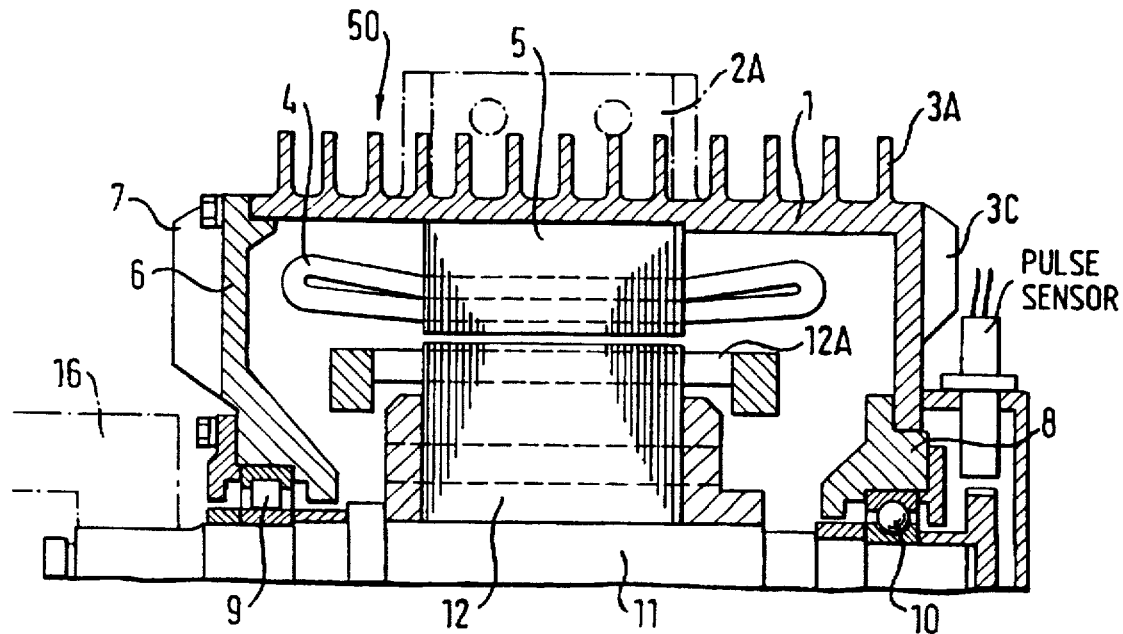
FIG. 18 is a half longitudinal sectional view showing one example of a conventional totally-enclosed self-cooled traction motor for electric railcar.
Figure 19:
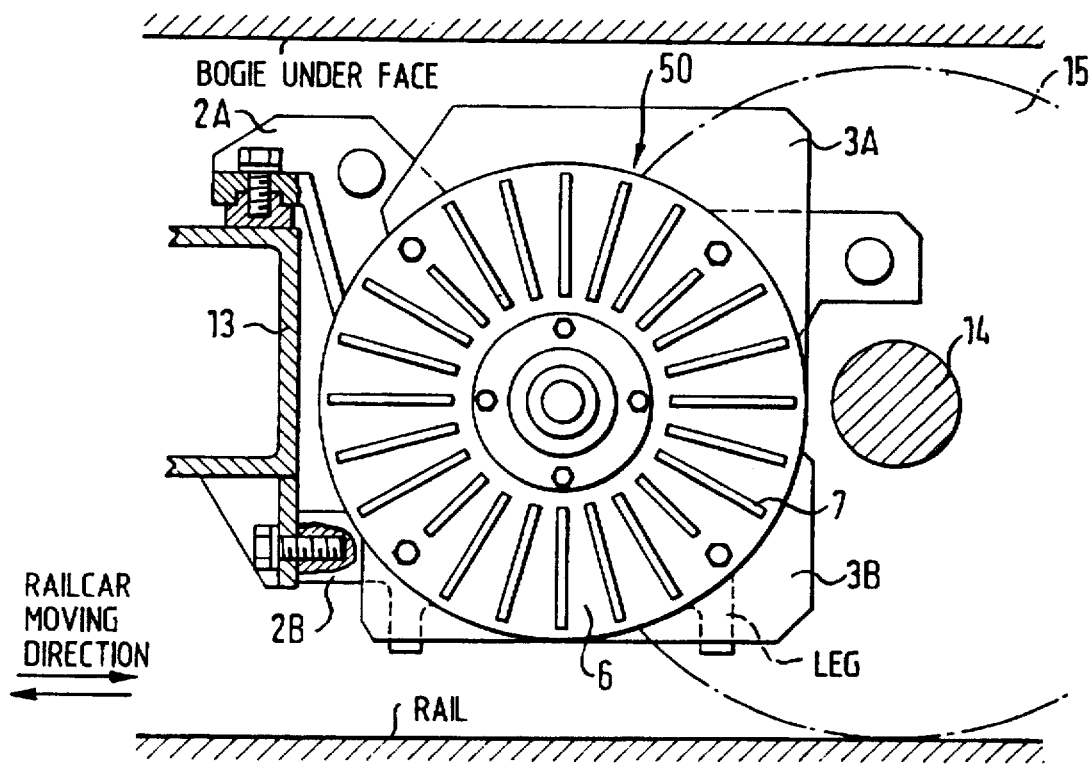
FIG. 19 is a side view of the traction motor shown in FIG. 18.
Figure 20:
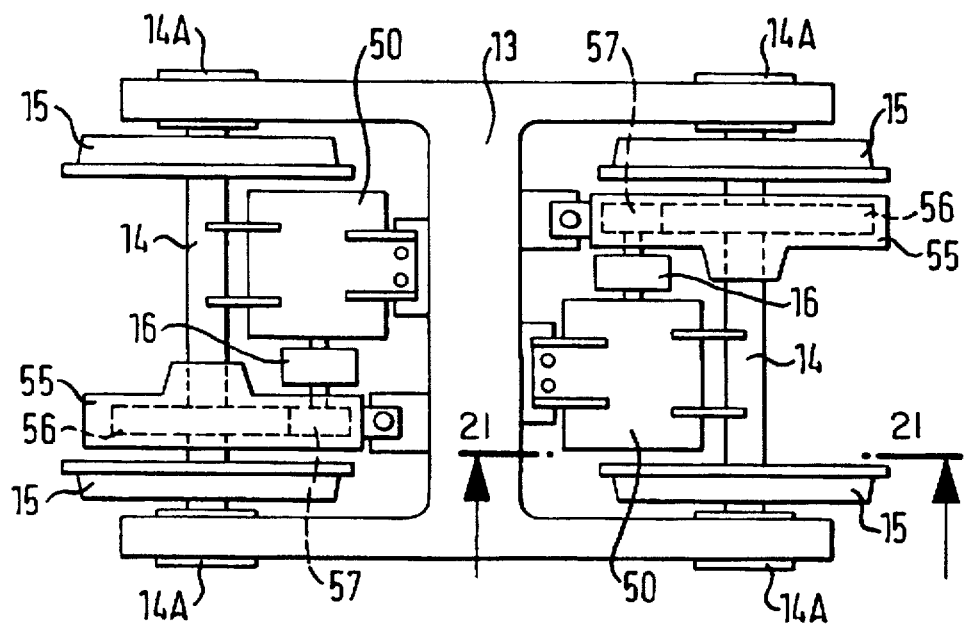
FIG. 20 is a top view of the traction motors shown in FIG. 18 mounted on a bogie.
Figure 21:
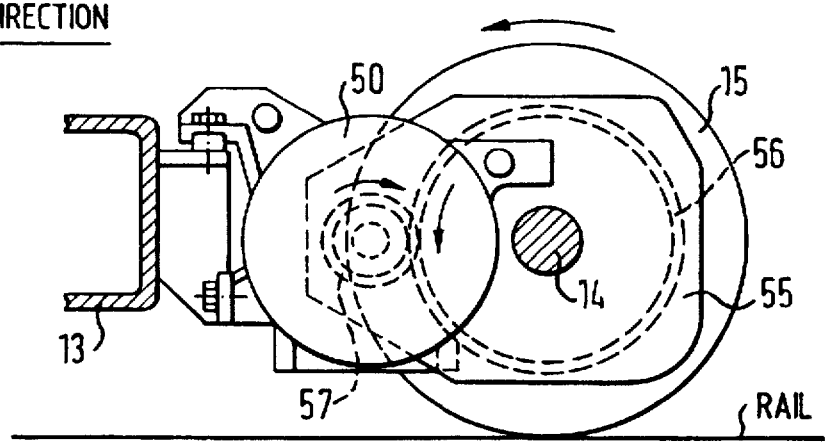
FIG. 21 is a sectional view of the traction motor along a line A—A shown in FIG. 20.

FIG. 17 is a half longitudinal sectional view showing a totally-enclosed traction motor 150 for an electric railcar according to a seventh embodiment of the present invention, corresponding to FIG. 14.

In FIG. 17, what is differing from FIG. 14 is that a polyphenine sulfide resin made heat insulating material 122 is used between each of connecting sections 110a of a cooler 110C and cylinder frame 106a and fastened by bolts 119.

In this case, it is possible to further reduce heat transferred to cooler 110C from cylinder frame 106a and further lower temperature of the cooling air flowing into the inside of cylinder frame 106a to cool the rotor and the like, than those in traction motor 150 shown in FIG. 14.

Further, in the above embodiments, coolers 110A, 110A1 and 110C made of aluminum alloy are described, but they may be made of stainless steel or materials having excellent heat conductivity of copper or copper alloy may be usable.

In addition, although as for the traction motor, a squirrel-cage induction motor is described in the above embodiments, this invention is applicable to any traction motor regardless of type provided that it is equipped with an internal fan and external coolers.

As described above, according to this invention, it is possible to provide a totally-enclosed traction motor for an electric railcar which can improve the cooling effect of the traction motor, and is thereby capable of achieving downsizing and light weight of the traction motor. It is further possible to provide a totally-enclosed traction motor for an electric railcar which can increase current capacity and the ratings of the traction motor. According to this invention, it is also possible to provide a totally-enclosed traction motor for an electric railcar which can prevent the contamination in the traction motor by the introduced outer air and can eliminate the periodical maintenance of the traction motor. Furthermore, it is possible to provide a totally-enclosed traction motor for an electric railcar which can reduce the noise generated by the traction motor.

Obviously, numerous modifications and variations of the present invention are possible in light of the above teachings. It is therefore to be understood that within the scope of the appended claims, the invention may be practiced otherwise than as specifically described herein.

What is claimed is:

1. A totally-enclosed traction motor for electric railcar, comprising:

frame structure of totally-enclosed cylindrical shape;

a rotor shaft rotatably supported to said frame structure coaxially with said frame structure;

a rotor of cylindrical shape coaxially fixed to said rotor shaft which is rotated with said rotor shaft as one body;

a stator of cylindrical shape fixed to an inner surface of said frame structure coaxially with said rotor shaft, with keeping a gap between an inner surface of said stator and an outer surface of said rotor;

said frame structure being provided with a window; and a cooling body mounted to said frame structure so as to cover said window and provided with a plurality of heat absorbing fins fixed to said cooling body from the inside and a plurality of radiation fins fixed to said cooling body from the outside.

2. The totally-enclosed traction motor for electric railcar according to claim 1:

wherein said frame structure is composed of a cylindrical frame with one side opening and a bearing bracket fixed to said cylindrical frame to cover said one side opening;

wherein said cylindrical frame is provided with a plurality of upper windows, a plurality of lower windows and a plurality of side windows; and wherein said cooling body includes a plurality of upper cooling bodies, a plurality of lower cooling bodies and a plurality of side cooling bodies, each being mounted to said cylindrical frame so as to cover one of said upper, lower and side windows and provided with a plurality of said heat absorbing fins fixed to one of said upper, lower and side cooling bodies from the inside and a plurality of said radiation fins fixed to one of said upper, lower and side cooling bodies from the outside, respectively.

3. The totally-enclosed traction motor for electric railcar according to claim 1:

wherein said frame structure is composed of a cylindrical frame with one side opening and a bearing bracket fixed to said cylindrical frame to cover said one side opening;

wherein said bearing bracket is provided with a side window as said window; and wherein said cooling body includes a side cooling body mounted to said bearing bracket so as to cover said side window and provided with a plurality of said heat absorbing fins fixed to said side cooling body from the inside and a plurality of said radiation fins fixed to said side cooling body from the outside, respectively.

4. The totally-enclosed traction motor for electric railcar according to claim 1:

wherein said rotor is composed of a rotor core and a plurality of rotor bars; and wherein said rotor core is provided with a plurality of air holes in said rotor core in the axial direction.

5. A totally-enclosed traction motor for electric railcar, comprising:

frame structure of totally-enclosed cylindrical shape;

a rotor shaft rotatably supported to said frame structure coaxially with said frame structure;

a rotor of cylindrical shape coaxially fixed to said rotor shaft which is rotated with said rotor shaft as one body;

a stator of cylindrical shape fixed to an inner surface of said frame structure coaxially with said rotor shaft, with keeping a gap between an inner surface of said stator and an outer surface of said rotor;

a fan for air circulation fixed to said rotor shaft which is rotated with said rotor shaft as one body;

said frame structure being provided with a pair of air windows in an upper part of said frame structure;

a cooling unit provided on an upper surface of said frame structure, said cooling unit being composed of a pair of connecting sections, a cooling pipe connected between said connecting sections and a plurality of cooling fins fixed to said cooling pipe;

said connecting sections being fixed to said upper surface of said frame structure so as to cover respective one of said air windows;

said frame structure being further provided with a window; and a cooling body mounted to said frame structure so as to cover said window and provided with a plurality of heat absorbing fins fixed to said cooling body from the inside and a plurality of radiation fins fixed to said cooling body from the outside.

6. The totally-enclosed traction motor for electric railcar according to claim 5:

wherein said frame structure is provided with a plurality of side windows and a plurality of lower windows as said window; and wherein said cooling body includes a plurality of side cooling bodies and a plurality of lower cooling bodies, each being mounted to said frame structure so as to cover one of said side and lower windows and provided with a plurality of said heat absorbing fins fixed to one of said side and lower cooling bodies from the inside and a plurality of said radiation fins fixed to one of said side and lower cooling bodies from the outside, respectively.

7. The totally-enclosed traction motor for electric railcar according to claim 5:

wherein said rotor is composed of a rotor core and a plurality of rotor bars; and wherein said rotor core is provided with a plurality of air holes in said rotor core in the axial direction.

8. The totally-enclosed traction motor for electric railcar according to claim 5, wherein:

said cooling unit is composed of a plurality of said cooling pipes connected between said connecting sections and a plurality of said cooling fins; and said cooling fins are fixed to said cooling pipes such that a gap is provided between said upper surface of said frame structure and a lower end of each of said cooling fins.

9. The totally-enclosed traction motor for electric railcar according to claim 8, wherein:

said cooling unit is fixed to said frame structure such that said connecting sections are fixed to said upper surface of said frame structure via heat insulating material.

10. The totally-enclosed traction motor for electric railcar according to claim 8, further comprising:

a lower cooler provided on a lower surface of said frame structure;

wherein said frame structure is further provided with a pair of lower breathers in a lower part of said frame structure; and wherein said lower cooler is composed of a pair of lower connecting sections, a plurality of lower cooling pipes connected between said lower connecting sections and a plurality of lower cooling fins fixed to said lower cooling pipes, and said lower connecting sections are fixed to said lower surface of said frame structure so as to cover respective one of said lower breathers, and said cooling fins are fixed to said lower cooling pipes such that a gap is provided between an lower surface of said frame structure and an upper end of each of said lower, cooling fins.

* * * * *